US 7,058,200 B2

(12) United States Patent
Donescu et al.

(10) Patent No.: US 7,058,200 B2
(45) Date of Patent: Jun. 6, 2006

(54) METHOD FOR THE PRIOR MONITORING OF THE DETECTABILITY OF A WATERMARKING SIGNAL

(75) Inventors: Ioana Donescu, Rennes (FR); Hervé Le Floch, Rennes (FR); Eric Nguyen, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 09/971,690

(22) Filed: Oct. 9, 2001

(65) Prior Publication Data

US 2002/0051560 A1 May 2, 2002

(30) Foreign Application Priority Data

Oct. 27, 2000 (FR) .................................. 00 13878

(51) Int. Cl.
*G06K 9/00* (2006.01)
(52) U.S. Cl. ........................ 382/100; 382/232
(58) Field of Classification Search ................. 382/100
See application file for complete search history.

(56) References Cited

U.S. PATENT DOCUMENTS

| 6,504,941 | B1 * | 1/2003 | Wong ......................... 382/100 |
| 6,738,495 | B1 * | 5/2004 | Rhoads et al. .............. 382/100 |

FOREIGN PATENT DOCUMENTS

| EP | 1 043 687 A1 | 10/2000 |
| FR | 2 792 152 A | 10/2000 |
| FR | 2 792 153 A | 10/2000 |
| WO | WO 98 34398 A | 12/1998 |

OTHER PUBLICATIONS

Tabuman, David; "High Performance Scalable Image Compression with EBCOT"; IEEE Transactions on Image Processing, vol. 9, No. 7; Jul. 2000).*
Wenjun Zeng et al., "On Resolving Rightful Ownerships of Digital Images by Invisible Watermarks," Proc. ICIP, pp. 552-555, Oct. 1998 (copyright notice date 1997).
Junji Ohishi et al., "A Method Of Watermarking With Multiresolution Analysis And Pseudo Noise Sequences"; Systems and Computers in Japan, vol. 29, No. 5, 1998; pp. 3020-3028.
David Taubman, "High Performance Scalable Image Compression With EBCOT"; IEEE Transactions On Image Processing, vol. 9, No. 7, Jul. 2000; pp. 1158-1170.

(Continued)

*Primary Examiner*—Brian Werner
*Assistant Examiner*—Christopher Lavin
(74) *Attorney, Agent, or Firm*—Fitzpatrick, Cella, Harper & Scinto

(57) ABSTRACT

A method for the prior monitoring of the detectability of a watermarking signal inserted by modulation in a set of coefficients representing for example a digital image. The method comprises the step of simulating a distortion on the set of modulated coefficients, the distortion corresponding to a given compression level of the set of coefficients before modulation, determined by optimisation of a ratio of transmission rate to distortion. The method further comprises the step of calculating a detectability test on the set of modulated coefficients after distortion, and a step of comparing the detectability test with a threshold detection value. The method is used notably for inserting a watermarking signal during the compression of a digital image.

30 Claims, 9 Drawing Sheets

OTHER PUBLICATIONS

M.D. Swanson, M. Kobayashi and A. Tewfik; "Multimedia data embedding and watermarking technologies". IEEE Proceedings, 86 (6): 1064-1087, 1998.

D. Taubman, "High Performance Scalable Image Compression With EBCOT", In Proc. ICIP, pp. 344-348, 1999.

D. Taubman, "High Performance Scalable Image Compression With EBCOT", IEEE, Trans. On Image Processing, vol. 9, No. 7, pp. 1158-1170, Jul. 2000.

W. Zeng et al. "Transform domain perceptual watermarking With Scalable Visual Detection". In JPEG 2000 contribution, ISO/IEC JTC1/SC29/WG1 N759, pp. 1-17, Mar. 1998.

* cited by examiner

METHOD FOR THE PRIOR MONITORING OF THE DETECTABILITY OF A WATERMARKING SIGNAL

BACKGROUND OF THE INVENTION

1. Field of the Invention

The present invention relates to a method for the prior monitoring of the detectability of a watermarking signal.

It also relates to a method for determining a partitioning of a set of coefficients, in order to insert a watermarking signal with prior monitoring of the detectability of this watermarking signal.

It also relates to a method of inserting a watermarking signal during the compression of a set of coefficients representing a digital image.

In general terms, the present invention concerns the watermarking of data, representing for example a digital image, with an a priori monitoring of the detectability of the watermarking signal after compression of the data.

More precisely, the concern here is with the application of a watermarking method used at the same time as a compression method optimised in terms of transmission rate/distortion.

2. Description of the Related Art

Watermarking techniques are frequently used for inserting information in a digital image. This information can, for example, make it possible to authenticate copyright on the image.

In practice, this insertion technique consists of modifying certain coefficients representing a digital image, in a manner which is imperceptible but subsequently decodable.

The concern here is with so-called robust insertion methods; that is to say, the inserted watermarking signal can be decoded after various distortions undergone by the image, and, in particular, after compression.

More precisely, this is a case of a statistical watermarking method, based on the slight pseudo-random modification of a certain number of coefficients representing at least part of a digital image in order to insert an information bit. In this type of statistical method, the decoding is effected by applying a statistical test, based on a measurement of correlation, in order to detect the presence of a pseudo-random signal inserted in the digital data.

The statistical test thus carried out makes it possible to associate a measurement of confidence with the decoding.

A method of inserting a robust watermarking signal is known, which makes it possible to guarantee a fixed correct detection probability, as described in the patent application EP 1 043 687 in the name of the Applicant.

The insertion of the watermarking signal is effected in a transformed domain of the digital coefficients (for example, after a discrete wavelet transformation).

The conditions making possible the insertion by modulation of a watermarking while complying with the criteria of detectability and imperceptibility are determined.

For this purpose, a calculation function integrating an additive noise is used. This additive noise, decorrelated from the coefficients, makes it possible to model a distortion applied to the coefficients.

This theoretical distortion is, however, adapted neither to the image being processed nor to the compression technique used for the coding the image.

In particular, the additive noise does not actually model a compression but rather a disturbance during a transmission of the image.

SUMMARY OF THE INVENTION

The present invention is made in consideration of the above situation, and has as its object to provide a method of monitoring the detectability of a watermarking signal, making it possible to guarantee the robustness of the watermarking signal inserted for a predetermined compression level.

To this end, the present invention concerns a method for the prior monitoring of the detectability of a watermarking signal inserted by modulation in a set of coefficients representing a physical quantity.

According to the invention, this prior monitoring method comprises the following steps:

simulating a distortion on the set of modulated coefficients, said distortion corresponding to a given level of compression of said set of coefficients before modulation, determined by optimisation of a ratio of transmission rate to distortion;

calculating a detectability test on the set of coefficients modulated after distortion; and comparing the detectability test with a threshold detection value.

By means of the simulation of a distortion on the modulated coefficients, it is possible to a priori monitor the detectability of the watermarking signal inserted after compression of the digital data.

In other words, the effect of the compression on the decodability of the inserted watermarking signal is thus monitored.

In practice, it is checked that the probability of detection of each information bit inserted is greater than a predetermined detection threshold value.

According to a preferred embodiment of the invention, at the simulation step, the distortion is a quantisation of each coefficient modulated by a predetermined step corresponding to a limited number of coding passes.

The simulation of the distortion is thus implemented by truncating the modulated coefficients for a given number of coding passes, determined in advance by optimisation of the ratio of transmission rate to distortion during a coding of the coefficients before modulation.

According to another preferred embodiment of the invention, the method for the prior monitoring of the detectability comprises the following steps:

modulation of a set of coefficients by insertion on the one hand of an information bit, and on the other hand of the inverse information bit;

calculating a detectability test on the one hand for the insertion of said information bit, and on the other hand for the insertion of the inverse information bit on all the coefficients modulated after the step of simulating a distortion;

determination of the minimum value, in absolute value, of said detectability test; and comparing said minimum value with a threshold detection value.

It is thus possible to ensure the detectability of an information bit after compression, both for the insertion of a (+1) and for the insertion of a (−1).

It should be noted that, although using a statistical method by modulation, the implementation thus proposed makes this method quasi-deterministic. This is because this method uses a statistical detection test, but the result of this detection test for a given compression level is controlled in a quasi-deterministic manner.

According to a second embodiment of the invention, a method for determining a partitioning of a set of coefficients representing a physical quantity for inserting a watermarking signal comprises the following steps:

modulation of all the coefficients in order to insert an information bit;

prior monitoring of the detectability of the information bit inserted by the detectability monitoring method according to the first embodiment of the invention; and dividing all the coefficients into distinct subsets of coefficients if the detectability test calculated is greater than the detection threshold value.

It is thus possible to effect an adaptive partitioning of a set of coefficients representing, for example, a digital image, using a detectability criterion, in order to optimise the number of distinct regions of the image in which an information bit of the watermarking signal can be inserted.

This method of determining a partitioning of a set of coefficients makes it possible to estimate the insertion capacity of this set of coefficients with a correct probability of detection for a fixed level of compression.

According to a third embodiment of the invention, a method of inserting a watermarking signal during the compression of a set of coefficients representing a physical quantity comprises the following steps:

spatio-frequency transformation of said set of coefficients;

partitioning said set of coefficients into subsets;

storing coefficients of said subsets;

entropic coding by successive bit planes of the coefficients of said subsets;

determining a limit coding point corresponding to a limit number of coding passes on each subset of coefficients, determined by optimisation of a ratio of transmission rate to distortion;

storing said limit coding points for each subset of coefficients;

inserting by modulation a watermarking signal on the coefficients of said stored subsets, after monitoring the detectability of said watermarking signal inserted according to the method of prior monitoring of the detectability in accordance with the first aspect of the invention; and entropic coding by successive bit planes of said modulated coefficients.

The present invention makes it possible to effect the watermarking at the same time as the compression of a digital signal.

The insertion of the watermarking signal with prior monitoring its detectability can thus be effected directly during the compression of, for example, a digital image, requiring a minimum number of additional steps.

According to a preferred embodiment of this method of inserting a watermarking signal, at the insertion step, a step of determining a partitioning is implemented on each subset of coefficients stored according to the method of determining a partitioning according to the second embodiment of the invention.

It is thus possible to effect, simultaneously with the compression of the digital signal, a partitioning thereof into several valid insertion supports on which the detectability of the inserted information bit can be ensured a priori for a given compression level.

According to a preferred embodiment of the invention, the step of entropic coding by bit planes of a subset of modulated coefficients is implemented up to the limit coding point stored for said subset.

It is thus not necessary to effect the entropic coding on all the bit planes of each subset of modulated coefficients. It suffices to encode only the bit planes which will be retained after compression of the modulated coefficients.

The present invention also provides a device for the prior monitoring of the detectability of a watermarking signal inserted by modulation in a set of coefficients representing a physical quantity.

This monitoring device comprises:

means of simulating a distortion on all the modulated coefficients, said distortion corresponding to a given level of compression of said set of coefficients before modulation, determined by optimisation of a ratio of transmission rate to distortion;

means of calculating a detectability test on the set of coefficients modulated after distortion; and means of comparing the detectability test with a threshold detection value.

This device for the prior monitoring of detectability has characteristics and advantages similar to those described previously for the method for the prior monitoring of detectability in accordance with the first embodiment of the invention.

Likewise, the present invention concerns a device for determining a partitioning of a set of coefficients representing a physical quantity for inserting a watermarking signal, comprising:

means of modulating the set of coefficients in order to insert an information bit;

means of prior monitoring of the detectability of the information bit inserted by the detectability monitoring method according to the first embodiment of the invention; and means of dividing the set of coefficients into distinct subsets of coefficients if the detectability test calculated is greater than the detection threshold value.

This device for determining a partitioning has characteristics and advantages similar to those described previously for the determination method according to the second embodiment of the invention.

Finally, the present invention provides a device for inserting a watermarking signal during the compression of a set of coefficients representing a physical quantity, comprising:

means of spatio-frequency transformation of said set of coefficients;

means of partitioning said set of coefficients into subsets;

means of storing coefficients of said subsets;

means of entropic coding by successive bit planes of the coefficients of said subsets;

means of determining a limit coding point corresponding to a limit number of coding passes on each subset of coefficients, determined by optimisation of a ratio of transmission rate to distortion;

means of storing said limit coding points for each subset of coefficients;

means of inserting by modulation a watermarking signal on the coefficients of said stored subsets, after monitoring the detectability of said watermarking signal inserted according to the method of prior monitoring of the detectability in accordance with the first aspect of the invention; and means of entropic coding by successive bit planes of said modulated coefficients.

This device for inserting a watermarking signal has characteristics and advantages similar to those described previously for the method of inserting a watermarking signal in accordance with the third embodiment of the invention.

The present invention also relates to a computer and a digital image processing appliance, such as a camera or a digital photographic apparatus, adapted to implement the method of prior monitoring of the detectability of a watermarking signal and/or a method of determining a partitioning and/or a method of inserting a watermarking signal according to the invention.

Finally, the present invention provides a computer program which can be read by a microprocessor, comprising portions of software code adapted to implement the method for the prior monitoring of detectability and/or the method of determining a partitioning and/or the method of inserting a watermarking signal according to the invention, when said program is loaded into a computer.

Other particularities and advantages of the invention will also emerge from the following description.

BRIEF DESCRIPTION OF THE DRAWINGS

The accompanying drawings, which are incorporated and constitute a part of the specification, illustrate embodiments of the invention, and together with the description, serve to explain the principles of the invention.

DETAILED DESCRIPTION OF THE PREFERRED EMBODIMENTS

A description will be given below of a preferred embodiment of the invention in which an adaptive watermarking method is implemented at the same time as the compression of a digital image.

Although in the remainder of the description a global digital image I is considered, all the methods detailed below can be applied to sub-parts of a digital image.

Likewise, these methods could be applied to digital data representing an audio signal.

Figure 2:
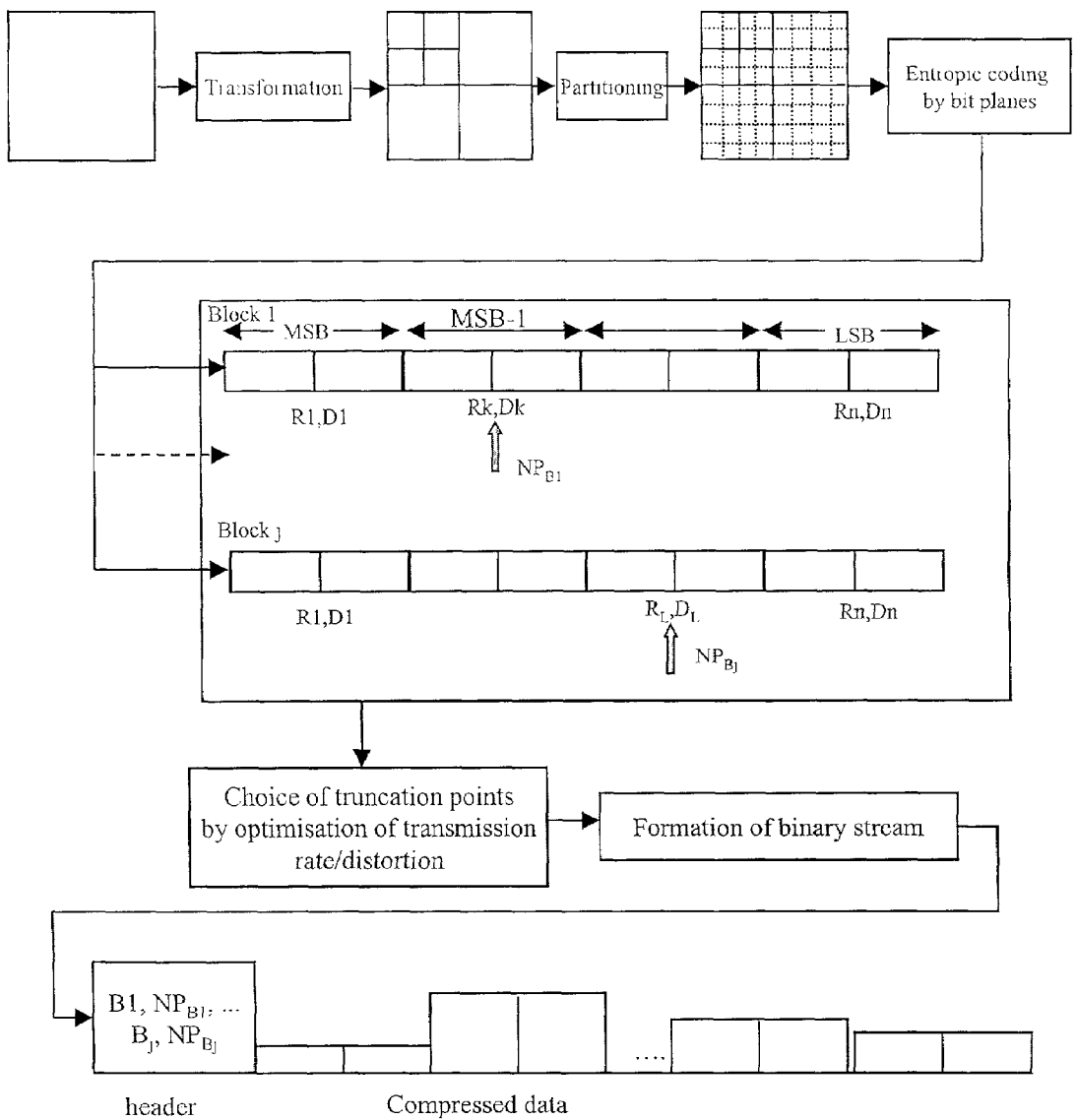
FIGS. 2 and 3 are explanatory diagrams illustrating the compression method used in FIG. 1.
Figure 3:
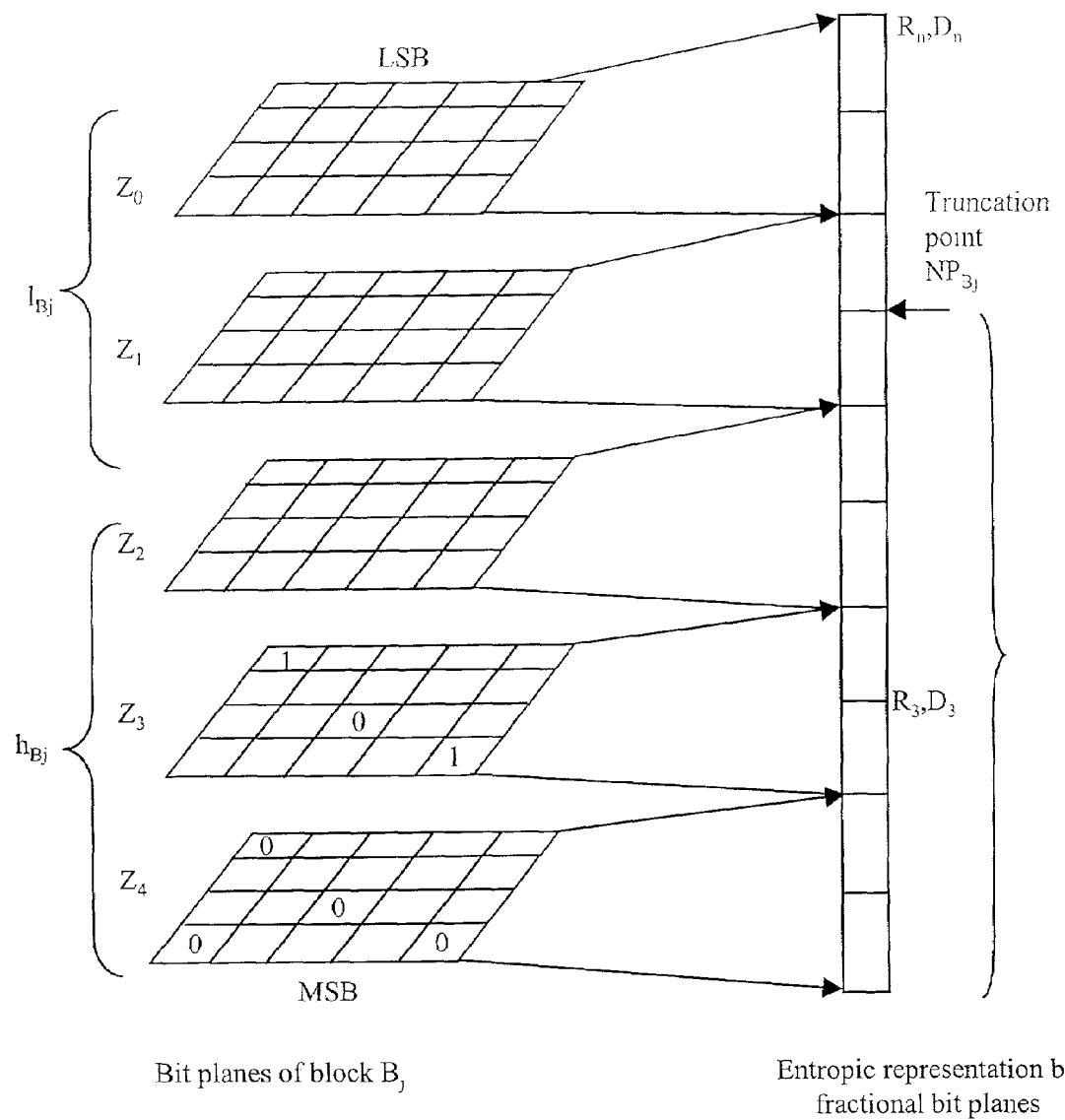

The compression method envisaged above, which will be described more particularly with reference to FIGS. 2 and 3, is based on an optimisation of the ratio of transmission rate to distortion.

The compression algorithm has the feature of scalability for transmission rate and distortion.

As used herein the term "scalability" means that the binary stream consisting of the compressed data contains several subsets, each of these subsets representing an effective compression of the digital image at fixed rate.

Reference can advantageously be made to the article by D. Taubman, "High Performance Scalable Image Compression with EBCOT", IEEE, Trans. on Image Processing, Vol. 9, N° 7, p. 1158–1170, July 2000, which describes a compression algorithm known as EBCOT ("Embedded Block Coding with Optimized Truncation"), which has this property of scalability.

In general terms the digital image I can be represented by a set of coefficients in the spatial domain, referred to as pixels of the image.

A digital image I consists of a series of digital samples. It is, for example, represented by a series of bytes, each byte value representing a pixel of the image I, which can be a black and white image, with 256 levels of grey.

Figure 1:
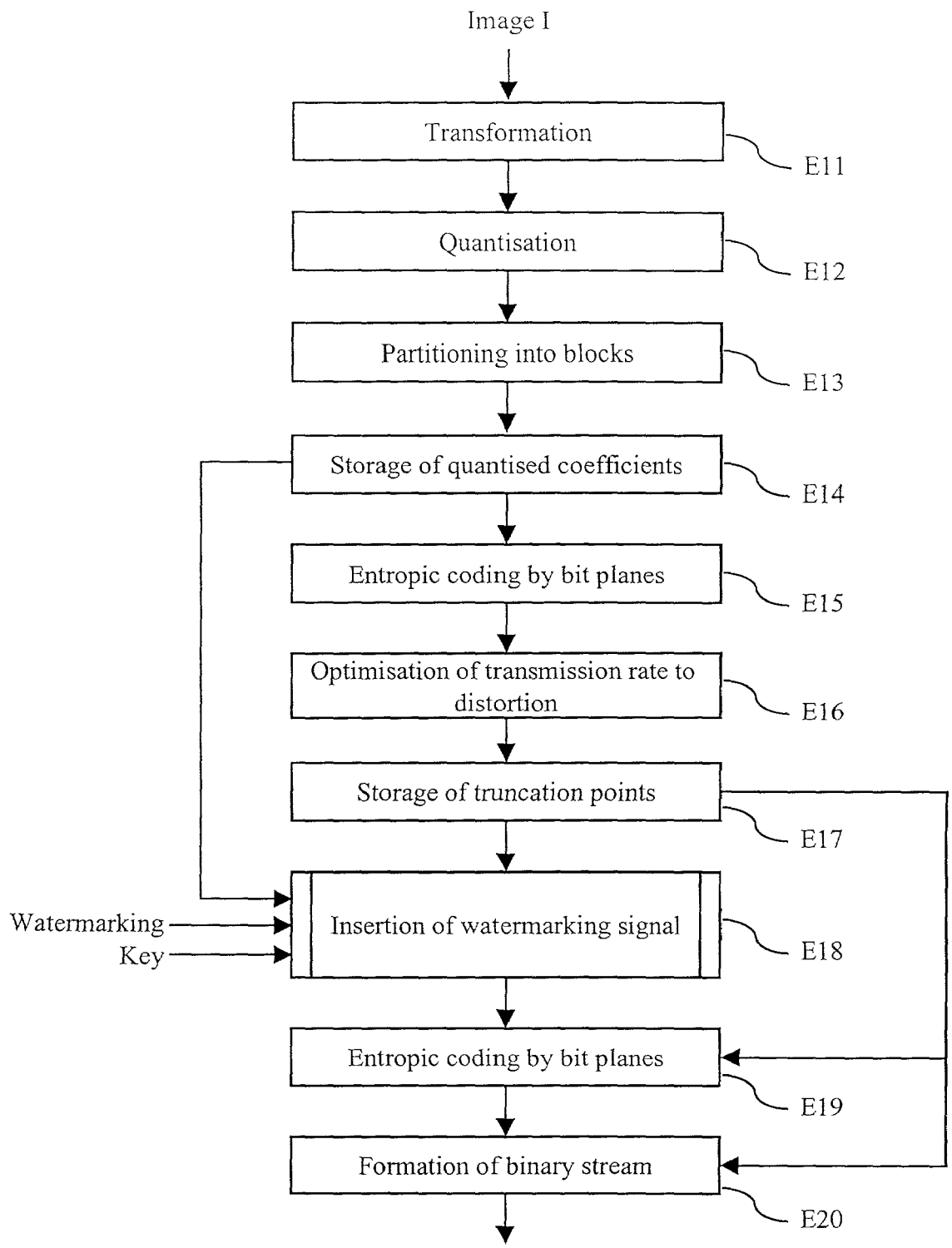
FIG. 1 is an algorithm illustrating a method of compressing and watermarking a digital signal according to one embodiment of the invention.

As illustrated in FIG. 1, the method of compressing such an image includes first, a transformation step E11, which can typically be a spatio-frequency transformation making it possible to represent all the digital coefficients in a transformed domain, the coefficients being located both in the spatial domain and in the frequency domain.

For example use is made of a discrete wavelet decomposition ("Digital Wavelet Transform" or DWT), making it possible to distribute the transformed coefficients in frequency sub-bands.

This wavelet transformation is well known to those of ordinary skill in the art, and accordingly, does not require a detailed description here.

Next, a quantisation step E12 can be implemented on all the transformed coefficients. This quantisation step may be a scalar quantisation by frequency sub-bands.

At the end of these transformation and quantisation steps, a partitioning E13 of all the coefficients is implemented in order to divide this set of coefficients into distinct sub-regions.

This partitioning is illustrated in FIG. 2. Here, a division of all the coefficients into blocks of identical sizes is considered.

Of course, any other type of partitioning making it possible to obtain distinct sub-regions of the set of coefficients could be implemented.

According to the present invention, a step E14 of storing the quantised coefficients is implemented so as to store each block of coefficients which will be used subsequently for inserting a watermarking signal.

After this storage step E14, an entropic coding step E15 proper is implemented. This entropic coding step E15 will be described in more detail with reference to FIG. 3.

Generally, an entropic coding is progressive in terms of ratio of transmission rate to distortion, applied to each block of coefficients.

Thus, each coefficient in a block is a real value which is typically quantised on a number of bits with a base 2 representation.

For example, a precision equal to 5 bits is considered here. The absolute value of a coefficient X1 of a block Bj is represented by:

$$X_j| = z_0 2^0 + z_1 2^1 + z_2 2^2 + z_3 2^3 + z_4 2^4$$

In FIG. 3, different bit planes are depicted from bottom to top, from the most representative to the least representative.

Here, the value $Z_4$ corresponds to the most significant bit plane MSB and the value $z_0$ corresponds to the least significant bit plane LSB.

Each bit plane of each coefficient is encoded in several coding passes, and with each coding pass k a corresponding rate $R_k$ and distortion $D_k$ are associated.

Each coding pass corresponds to a processing of the coefficients of a bit plane generating a portion of binary stream.

The coding passes are complementary for a given bit plane and make it possible to entirely code all the coefficients in the bit plane.

Here, by way of example, each bit plane is coded in two passes.

The coding of the bit planes could be effected in a greater number of passes, and, for example, in three passes as described in the EBCOT compression algorithm.

Here, the complete coding of each bit plane is divided into two coding passes.

In parallel to the representation in bit planes of a block $B_j$ of coefficients $X_i$, FIG. 3 depicts the series of coding passes, each containing an entropically coded item of binary information.

An order of numbering of the coding passes is chosen, here from 1 to n with n=10.

Returning to FIG. 1, after the entropic coding by bit planes of all the coefficients in a block, an optimisation algorithm in terms of transmission rate and distortion is applied. This optimisation step E16 makes it possible to determine a limit coding point corresponding to a limit number of coding passes for optimising the ratio of transmission rate to distortion on the block of coefficients.

This sort of optimisation algorithm is described in the EBCOT compression algorithm.

This limit coding point, also referred to later in the description as the truncation point, corresponds to a limit point up to which the encoded data are retained in the binary stream at the end of compression.

From the complete transmission/distortion representations of each block as illustrated in FIG. 3, it is possible to define a truncation point corresponding to the last coding pass taken into account. Here, this truncation point $NP_{Bj}$ is equal to 7 for the block $B_j$ Thus, only the first three most significant bit planes $Z_4$ $Z_3$ $Z_2$ are coded entirely with the chosen truncation point $NP_{Bj}$ Thus, for each block $B_j$, the truncation point defines the number of passes to be coded for the block $B_j$.

In this example, the set of coded data is optimised for a given transmission rate.

An optimisation algorithm could be implemented in an identical manner in order to optimise all the data coded for a given distortion.

As illustrated in FIG. 3, each truncation point $NP_{Bj}$ makes it possible to form the binary stream, each portion of binary stream being generated by a coding pass and the overall binary stream being formed by coding passes up to the point of truncation $NP_{Bj}$.

In this way, a quantisation of variable steps per block of coefficients is effected, according to the chosen truncation point. In practice, two adjacent blocks of the same frequency sub-band can thus be coded with different precisions; that is to say, with more or fewer bit planes retained at the end of the optimisation step E16.

Returning to FIG. 1, after the optimisation step E16 as described previously and the resulting identification of the different truncation points $NP_{Bj}$ associated with each block of coefficients $B_j$, a storage step E17 is implemented in order to store these truncation points in association with the blocks of coefficients concerned.

Next, the step E18 of insertion proper of a watermarking signal on the quantised coefficients stored at the storage step E14 is performed.

Figure 4:
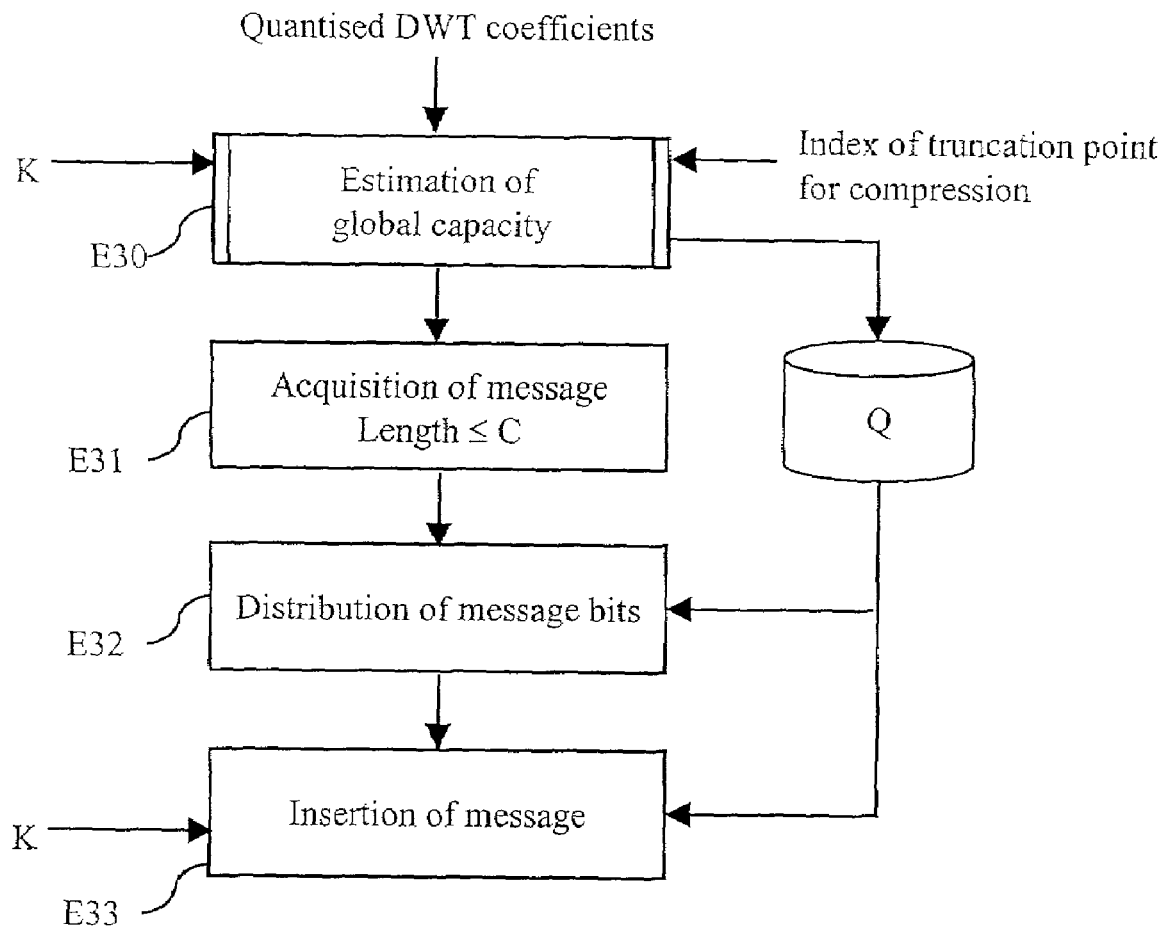
FIG. 4 is an algorithm detailing the step of inserting a watermarking signal of FIG. 1.
Figure 5:
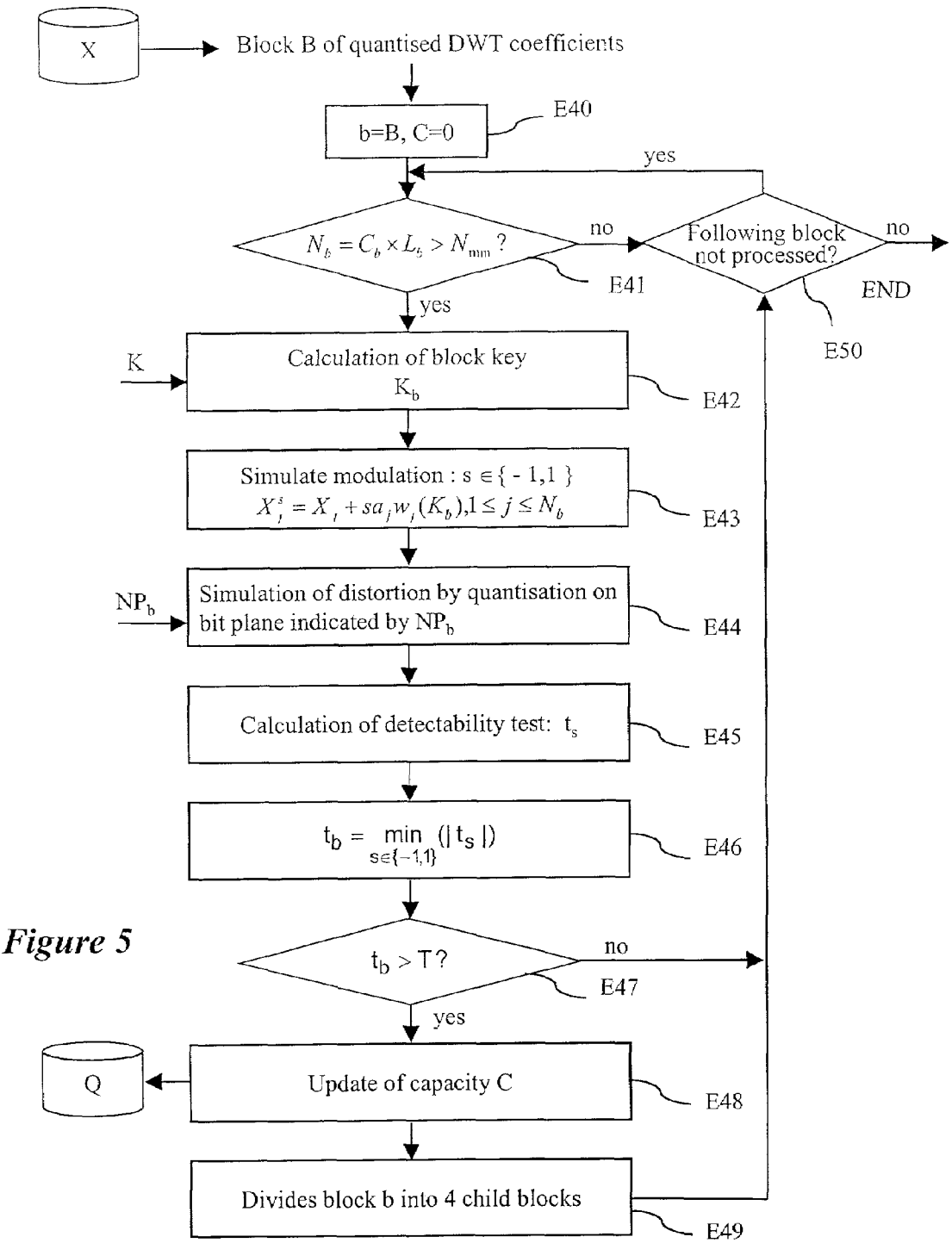
FIG. 5 is an algorithm detailing the step of estimating a global capacity in FIG. 4.

This insertion step E18 will be described later with reference to FIGS. 4 and 5.

Step E18 consists generally of modulating the non-coded coefficients, previously stored, in order to insert an information bit on a set of coefficients.

After modulation of the coefficients, an entropic coding step E19 is again applied, making it possible to code the modulated coefficients by bit planes.

This entropic coding step E19 can be optimised by using the truncation points $NP_{Bj}$ stored at the storage step E17. Thus, it is not necessary to effect the multipass entropic coding on all the bit planes of each modulated coefficient of the block in question. It suffices to effect solely the coding passes on the most significant bit planes which will be retained after truncation of the coefficients at a given number of passes, indicated by the truncation point $NP_{Bj}$.

A step of forming a binary stream E20 is then implemented in order to reconstitute a binary stream of compressed data. Likewise here, use is made of the truncation points stored at the storage step E17 for the formation of this binary stream.

This is based on the assumption that the set of data modulated by the insertion of the watermarking signal represents a global transmission rate after entropic coding, equivalent to that of the non-modulated data on which the truncation points were determined.

This assumption is all the more realistic if the method of inserting a watermarking signal used is a method of modulating a pseudo-random signal centred on each block of modulated coefficients, in particular if the weighting amplitude is constant on all the data processed.

A description will now be given, with reference to FIG. 4, of the steps relating to the insertion of a watermarking signal corresponding to a preferred embodiment of the invention.

Here, a partitioning is performed on each block of coefficients stored at the storage step E14. An estimation step E30 estimates the global capacity C of the digital image I; that is to say, the number of information bits which can be inserted and decoded after compression.

This capacity estimation step E30 will be described in detail with reference to FIG. 5.

In practice, the global capacity C of the image I is the sum of the capacities calculated for each block of coefficients defined previously by the partitioning effected for the compression of the image I.

The encoding capacity is therefore calculated independently of each block of coefficients. This capacity is defined as the number of information bits which can be inserted on sub-blocks of the block in question, so that each information bit is detectable after compression with a probability of detection greater than a predetermined threshold value.

Thus, a global capacity C is calculated of all the coefficients for a fixed detection threshold value.

At the end of this estimation step E30, a set of valid sub-blocks or supports is obtained, on which it is possible to insert an information bit, this set of valid supports being temporarily stored in a memory space Q.

After the calculation of the global capacity C, the acquisition of a message to be inserted is acquired during an acquisition step E31.

This acquisition can take place interactively, as by requesting of a user a message of a predetermined length, less than or equal to the global capacity C.

In practice, a step of displaying the global capacity C can be implemented for the user.

It is also possible to read a part of a message previously stored in memory.

A distribution step E32 is then implemented in order to distribute the information bits of the message on the different valid insertion supports stored in the memory Q.

This distribution of the information bits of the message can take place systematically.

Alternatively, certain message bits can be associated preferentially with certain spatio-frequency sub-bands of the spectral decomposition of the coefficients.

Thus, when the watermarking signal comprises information bits ordered in decreasing order of importance of the message, the insertion of the information bits, carried out along with the sequencing of the bits in the watermarking signal, is carried out in subsets of coefficients or valid insertion supports with increasing resolution levels.

At the end of the spatio-frequency transformation of the DWT type, the blocks of coefficients are distributed in frequency sub-bands with different resolution levels.

Thus, the information bits of the message will be inserted firstly in the insertion supports issuing from the partitionings of blocks of coefficients with the lowest resolution, and then in the insertion supports issuing from the partitionings of blocks of coefficients with a higher and higher resolution.

In this case, a robustness is aimed at with an additional compression or low-pass filtering.

More generally, the information bits are inserted on insertion supports preserved by the predictable distortions.

From this distribution and the valid supports stored, the insertion proper by modulation can be carried out.

In order to effect this modulation in a valid support b, a key $K_b$ peculiar to each valid support of coefficients b is used and the modulation of each coefficient $X_j$ of the support is effected:

$$X_j' = X_j + s\, a_j\, w_j\, (K_b)$$

where $s = +1$ or $-1$ according to the value of the information bit 1 or 0 to be inserted;

$a_j$ is a weighting coefficient; and $w_j$ (Kb) is the modulation carrier generated for each support b by virtue of the key $K_b$, generating pseudo-random numbers.

The generation key $K_b$ specific to each processed support b is dependent here, by way of example, on a secret encoding key K, the size of the support in question, and the coordinates of the top left-hand corner of the support in the reference frame of the initial block on which the partitioning was carried out.

In general terms, this generation key $K_b$ for each support b is dependent on a secret key K, the dimensions of the support b, and its position in the set of coefficients in question at the basis of the adaptive partitioning. In this way, modulation carriers are obtained specific to each support b, making it possible to decode the signal inserted on supports of variable size.

A description will now be given, with reference to FIG. 5, of the details of the step E30 of estimating the global capacity C of the image I.

This partitioning of the image is implemented on the initial partitioning carried out at the partitioning step E13 for the global method of compressing the digital image I.

For this purpose, use is made of the distribution into blocks of quantised coefficients stored during the storage step E14.

An initialisation step E40 makes it possible to initialise the index of block b to the value of the initial block B, referred to as the parent block, and the value of the global capacity C to a zero value.

In general terms, the estimation of the capacity of a set of coefficients is effected by simulating an insertion/extraction of a +1 and a −1 on each block of the set of coefficients. In practice, the detectability of each inserted bit of information is monitored and the block of coefficients is divided into sub-blocks of distinct coefficients if the calculated detectability test is greater than a predetermined threshold value.

This is a case of a descending recursive algorithm. The division into sub-blocks can be effected until a minimum allowed block size is reached. This minimum size $N_{min}$ is chosen based on considerations of validity of a statistical detection test applied to digital data.

For a block b of given coefficients, it is first checked, in a test step E41 whether the size of the block b is greater than the fixed minimum size $N_{min}$.

In practice, the size $N_b$ of the block b is equal to $C_b \times L_b$, where $C_b$ is the number of columns in the block b and $L_b$ is the number of rows in the block b.

If the result of the test is negative, the following unprocessed block, if such exists, in the stored partitioning is considered in a test step E50.

Otherwise, a generation key $K_b$ for pseudo-random numbers specific to the processed block b is calculated. In this calculation step E42, and as described previously, the key $K_b$ depends on the encoding key K, the size $N_b$ of the block and the coordinates of the top left-hand corner of the processed block in its reference frame of the parent block of the partitioning.

The generation key $K_b$ can be calculated in accordance with the formula:

$$K_b = K + N_b + (r_b \times C_b + c_b) \text{ where}$$

$r_b$ and $c_b$ are row and column indices in the reference frame of the parent block of the partitioning.

It is thus possible to generate a specific key $K_b$ for each processed block so that the keys are different at all levels of the tree representation of the partitioning, between a parent block and its child blocks.

Of course, any other formula for calculating a specific key for each processed block can be applied, from the moment that the keys are quite different at each level of the tree representation.

The aim of this method of generating modulation carriers at each level of the quadtree partitioning is to obtain statistically orthogonal carriers, which makes it possible to decode the signal inserted on supports of variable size in the partitioning.

A step of simulating a modulation E43 is then implemented for each information bit; that is to say, for the insertion of a (+1) and a (−1).

The conventional modulation formula is used, utilising the carrier w (Kb) specific to the processed block b.

Thus, each coefficient Xj of the block b of size Nb is modulated according to the formula:

$$X_j^s = X_j + s\, a_j\, w_j\, (K_b),\ 1 \leq j \leq N_b$$

where $s = -1$ or $+1$;

$a_j$ is a weighting coefficient; and $w_j$ ($K_b$) is the modulation carrier generated by the block b.

In accordance with the invention, a simulation step E44 is then implemented in order to simulate a distortion on the modulated coefficients $X_j^s$, $1 \leq j \leq N_b$.

Knowing the truncation point $NP_b$ associated with the processed block b, here a distortion is applied corresponding to the envisaged compression level, determined previously by optimisation of the ratio of transmission rate to distortion.

This distortion corresponds to a quantisation of each coefficient on the bit plane indicated by the truncation point $NP_b$.

Preferably, in order to simulate this distortion, each modulated coefficient is restricted to the most significant bit planes, coded entirely at the limit coding point $NP_b$.

Returning to FIG. 3, only the first h bit planes of all the coefficients of the block b are retained, where h is the number of bit planes coded entirely before $NP_b$ coding passes.

Here, h is equal to 3.

Denoting $l_b$ as the number of bit planes uncoded entirely at the point of truncation $NP_b$, $l_b = P - h_b$, where P is the precision of representation of each coefficient of the block b, here equal to 5.

The distortion applied to each coefficient $X_j^s$ can be effected in accordance with the following formula:

$$[X_j^s] = (X_j^s >> l_b) << l_b$$

where the symbol >> represents a shift to the right of $I_b$ bit planes and the symbol << represents a shift to the left of lb bit planes. The coefficient $X_j^s$ is thus quantised by a step equal to $2^{lb}$.

After simulation of the distortion, a calculation step E45 makes it possible to calculate a detectability test $t_s$.

This statistical detection test is thus applied to the truncated coefficients. Let $Y = [X_j^s] w_j$, which gives $$t_s = \frac{E[Y]\sqrt{N_b}}{\sigma_Y}$$

where E[Y] is the mean of Y, and
$\sigma_Y$ is the standard deviation of Y.

Such a statistical detection test is described in the article "On Resolving Rightful Ownership of Digital Images by Invisible Watermark" by W. Zeng and B. Liu, Proc. ICIP, pages 552–555, October 1998.

Next, there is determined, in a calculation step E46, the minimum value $t_b$, in absolute value, of the detectability tests $T_s$ obtained for s equal to (+1) and equal to (−1).

A comparison step E47 compares this minimum value $t_b$ with a threshold detection value T, this threshold detection value T being chosen according to a required probability of detection.

If the detectability condition is not satisfied, as when the minimum value $t_b$ is less than or equal to the threshold detection value T, the following non-processed block in the partitioning is considered.

If the detectability condition is satisfied, the global capacity C of the image is updated in a step E48 and the block b is temporarily stored as a valid support for insertion in the memory Q.

Next a partitioning E49 of the block b is effected in order to perform a prior check on the detectability of a watermarking signal on each of the sub-blocks issuing from the partitioning.

The use of this partitioning subject to a criterion of detectability of a watermarking signal and the updating of the global capacity C of the image are described in European patent application EP 1 043 687, and accordingly, do not require a detailed explanation here.

Figures 6A, 6B, 6C:
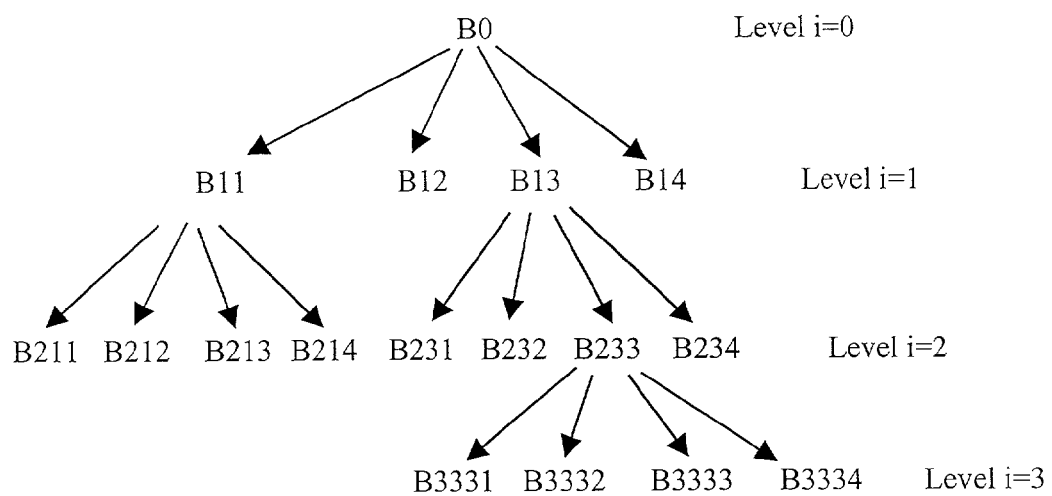
FIGS. 6a, 6b, 6c illustrate an example of partitioning, carried out during the estimation of the global capacity.

With reference to FIGS. 6a, 6b and 6c, a quadtree decomposition of each initial block of coefficients is used as a partitioning algorithm.

As illustrated in FIG. 6a, a parent block, denoted $B_0$, is divided into four blocks, referred to as child blocks, of identical size, denoted $B_{1i}$, with $1 \leq I \leq 4$.

The first index, here equal to 0 for the parent block $B_0$ and to 1 for the child blocks $B_{1i}$, indicates the division level of depth in the tree.

The decomposition is such that the parent block $B_0$ is of the size L×C, and each child block is of the size C/2×L/2.

It is assumed here that the initial size of each block $B_0$ is of the type $2^p \times 2^r$. Otherwise, arrangements are made in practice to have blocks of almost identical size.

As illustrated in FIG. 6b, each child block can in its turn be decomposed into sub-blocks, until the minimum size $N_b$ is reached. Each sub-block is denoted according to the level of depth in the tree, the branch number of the parent blocks, and its own branch number in the tree.

FIG. 6c depicts the quadtree decomposition in tree form. The order in which this tree is run through in a recursive procedure, as described previously with reference to FIG. 5 is as follows: the starting point is the parent block $B_0$ and a branch is followed down as far as the lowest level. The following block is the "brother" block of the same level and same parent. If such a block does not exist, the "brother" block of the parent block is passed to and so on. For example, with reference to FIG. 6c, the order of travel is:

$B_0$, $B_{11}$, $B_{211}$ . . . $B_{214}$, $B_{12}$, $B_{13}$, $B_{231}$, $B_{232}$, $B_{233}$, $B_{3331}$, . . . $B_{3334}$, $B_{234}$, $B_{14}$.

Thus, at the end of the estimation of the capacity of each parent block $B_0$, all the sub-blocks forming the valid insertion supports are retained. That is to say, those for which the value of the detection test after simulation of a compression level is greater than the predetermined threshold value T, both for the insertion of a (+1) and for the insertion of a (−1).

Thus, a partitioning of the image is obtained, on which it is possible to insert information bits after a prior check on the detectability for a given compression level.

In this way, insertion on the non-coded representative coefficients is effected, using the information supplied by the algorithm for optimisation of the ratio of transmission rate to distortion effected on the initial data before modulation. It is thus possible to simulate the distortion afforded by the compression effected on the digital image.

Figure 7:
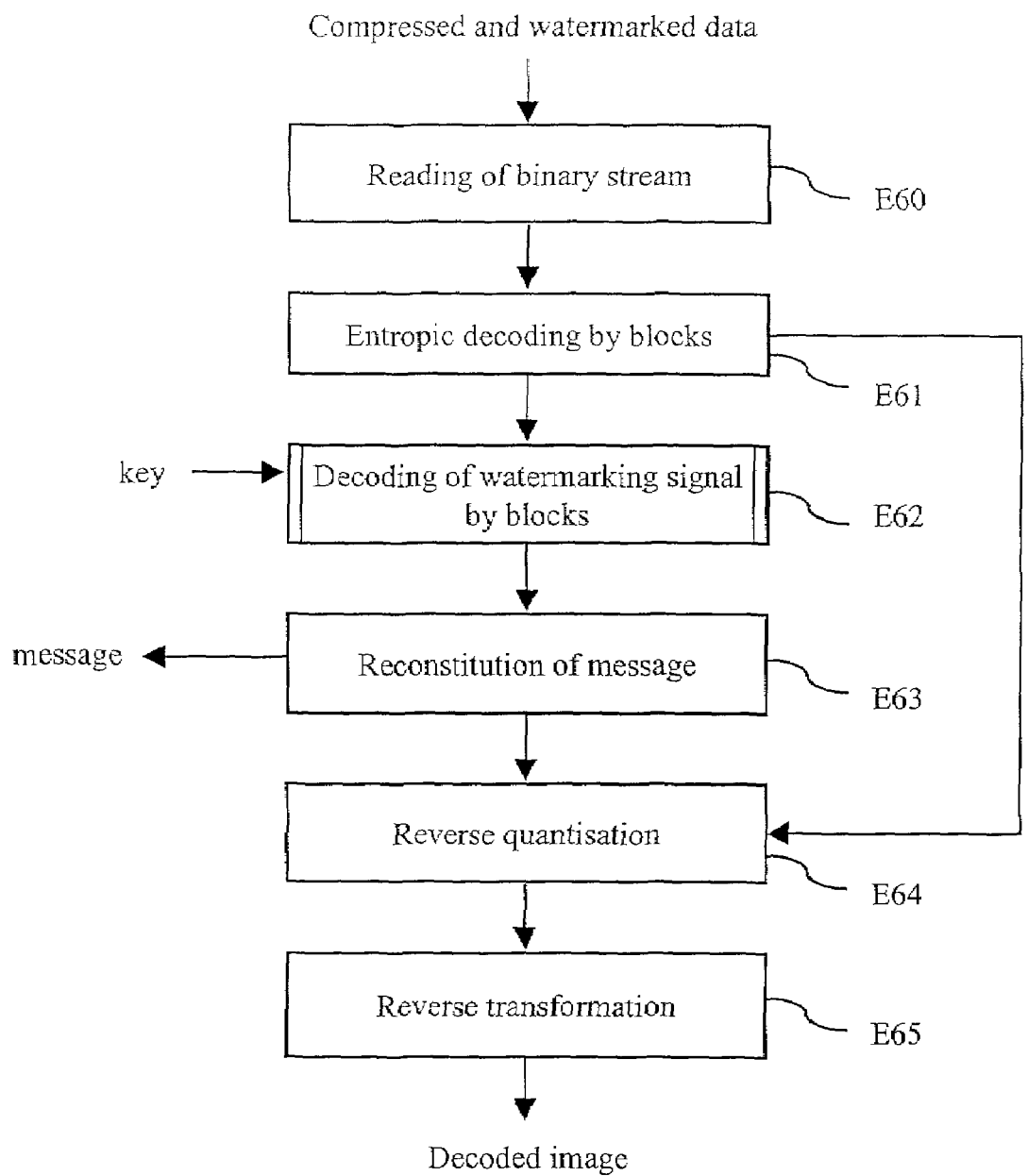
FIG. 7 is an algorithm illustrating a method of decompressing and extracting a watermarking signal.

A description will now be given, with reference to FIG. 7, of the principle of decoding of a watermarking signal carried out at the same time as the decompression of a compressed digital image.

Generally, the decoding method consists of performing the reverse operations corresponding to those carried out during the insertion of a watermark and the compression of the digital image as described in FIG. 1.

A reading step E60 makes it possible to read the binary stream formed by a series of data which has been compressed and modulated for the insertion of the watermarking signal.

An entropic decoding step E61 is implemented on each block of coefficients read in the binary stream.

As illustrated in FIG. 2 for each block of coefficients, the binary stream comprises, in its header, the limit coding point or truncation point $NP_B$, which makes it possible to effect the entropic decoding.

After the entropic decoding step E61, blocks of coefficients are obtained which have been transformed and possibly quantised if the quantisation step E12 was implemented during coding as described in FIG. 1.

A decoding step E62 proper extracts the watermarking signal inserted in each block of coefficients.

Figure 8:
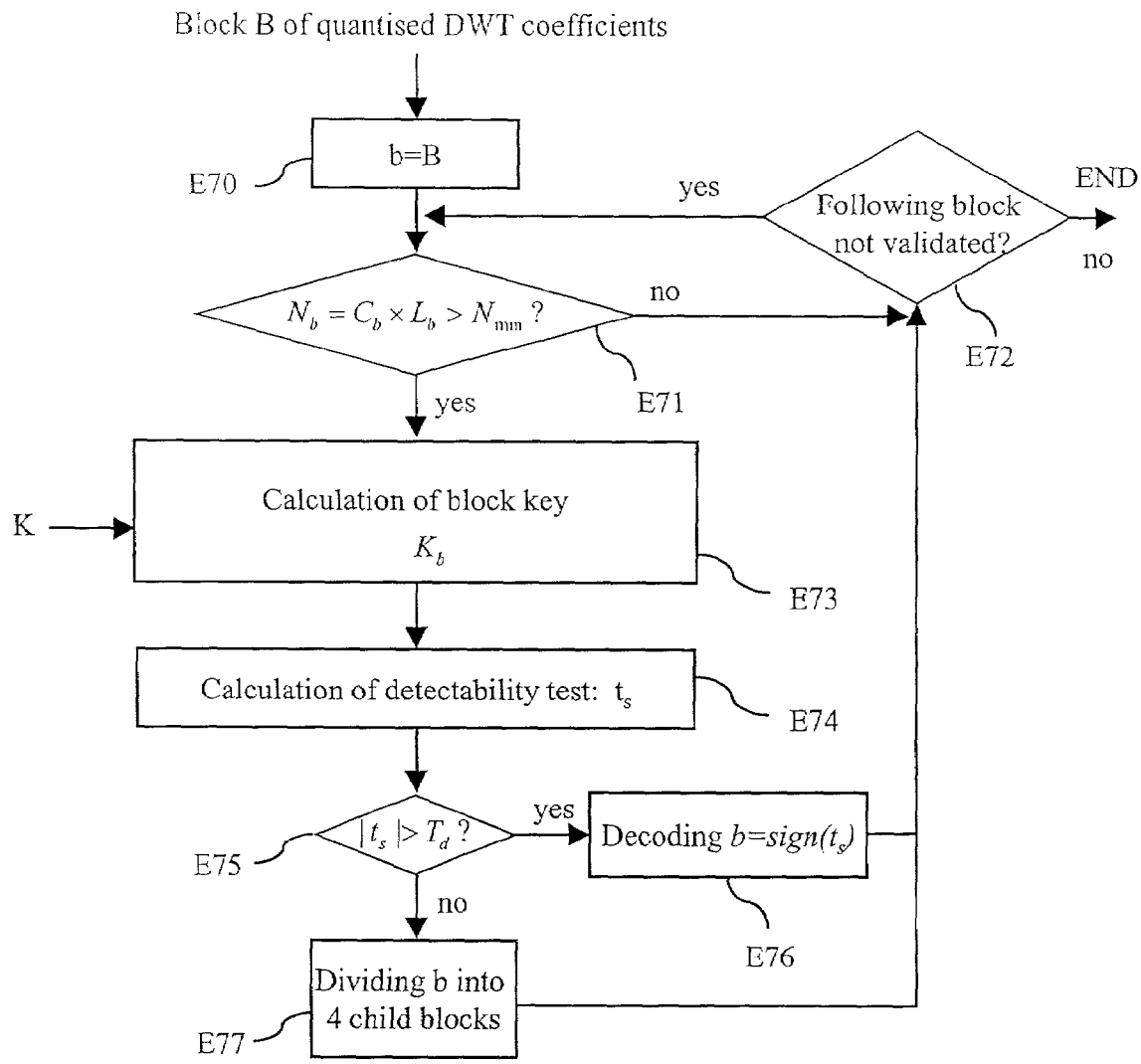
FIG. 8 is an algorithm detailing the step of extracting a watermarking signal of FIG. 7.

This decoding method, illustrated in detail in FIG. 8, corresponds to the insertion method described previously with reference to FIGS. 4 and 5.

It is assumed that each processed block b can contain a set of bits inserted on valid sub-supports of variable size, as depicted in a quadtree.

At the decoding device, no information is available concerning the number of information bits inserted in a given block or the size of each valid insertion support. The decoding is then performed by applying a recursive procedure, by partitioning of each block of coefficients b in a quadtree, until an information bit is identified.

Thus, a first block of coefficients b is considered in an initialisation step E70.

A test step E71 checks that the size of the block b, $N_b=C_b \times L_b$, is indeed greater than a minimum size $N_{min}$.

If this condition is not satisfied, the following block is considered in a step E72 if this following block exists.

If the size of the block b is indeed greater than the minimum size required, there is calculated, in a calculation step E73, a key $K_b$ for generating a series of pseudo-random numbers $w_i$ specific to the processed block b.

This function of calculating the key $K_b$ must be exactly the same as the one used during the insertion of an information bit.

Next there is calculated, in a calculation step E74, the value of the detectability test $t_s$ as explained previously during the calculation step E45 of the method of encoding an information bit.

A comparison step E75 compares the value of this detectability test $T_s$ in absolute value, with a detection threshold $t_d$.

It should be noted that this detection threshold $T_d$ may be slightly less than the threshold value T applied at the time of estimation of the global capacity of the digital image I.

For example, T=5 and $T_d$=4,5.

This difference is desirable in order to avoid simulating on the decoder the quantisation on the same bit plane as the one adopted during the coding of the information.

In addition, this difference in detection threshold makes it possible to tolerate, during the decoding of the inserted information, any additional distortions of low magnitude applied to the digital image, which would appear if the image were decompressed and recompressed with the same compression parameters.

At the end of test E75, if the detectability value $T_s$ is greater than the threshold value $T_d$, the detection is accepted.

The sign of the detectability test $T_s$ indicates the value 0 or 1 of the decoded bit which is stored in a storage step E76.

The processed block b is then considered to be a valid support and it is not necessary to continue the algorithm for decoding information in the child blocks issuing from this block b.

Then, in step E72, the following non-valid block is considered, if such exists.

On the other hand, if, at the end of test E75 the detectability test $t_s$ is below the threshold value $T_d$, the block b is divided into four child blocks in a division step E77 and, in a step E72, the following non-validated block is considered in the quadtree structure; that is to say, here the first child block of the block b.

Returning to FIG. 7, a step of reconstituting the message E63 reconstitutes the inserted message from the decoded stored bits for each block.

The rule of arrangement of the message must be identical to the one used during the coding of the information at the distribution step E32 for the message bits.

Once the inserted information has been decoded, decompression of the digital image can continue with conventional non-modified steps used in the decoder.

A reverse quantisation step E64 followed by a reverse transformation step E65 reconstitutes the decoded watermarked image.

The decompression method used on the compressed and watermarked digital image is thus only slightly modified by the decoding of the inserted information.

Only the steps of decoding E32 the bits of information per block and of reconstituting E63 a global message are interposed in the general decomposition method, after the step of entropic decoding by block E61.

It is thus possible to effectively effect the watermarking of a digital image at the same time as its compression and the extraction of the inserted message at the same time as the decompression of the digital image.

Figure 9:
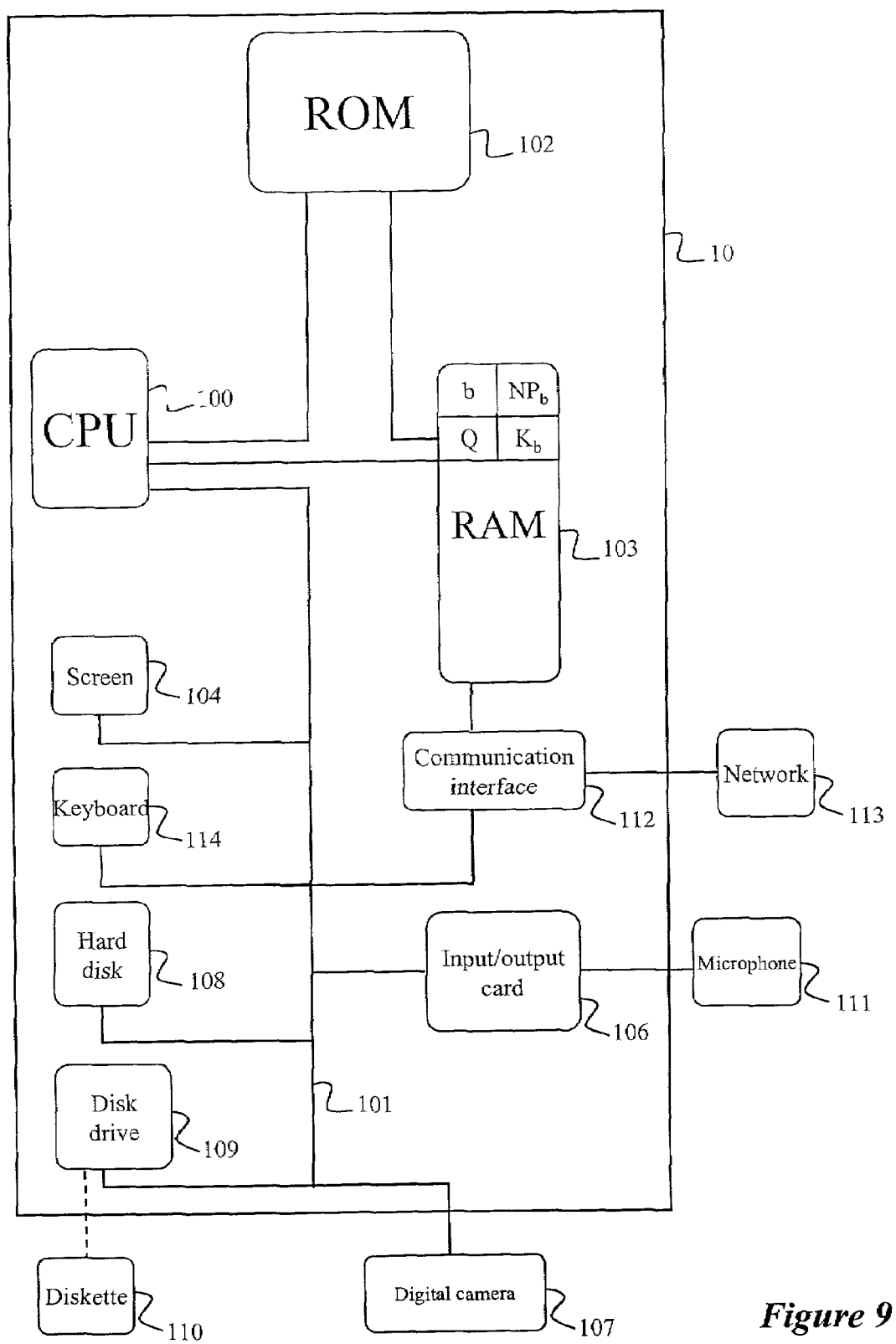
FIG. 9 is a block diagram illustrating a computer adapted to implement the methods according to the invention.

A device for implementing the invention is illustrated in FIG. 9.

This device can, for example, be a microcomputer 10 connected to different peripherals such as a digital camera 107 or a scanner, or any other means of acquiring or storing a digital image.

The digital camera 107 can be connected to a graphics card and makes it possible to supply information to be compressed and watermarked in accordance with the method of the invention.

The device 10 has a communication interface 112 connected to a network 113 adapted to transmit digital information to be compressed, or conversely, to transmit compressed information by means of the device on the communication network 113.

The device 10 also has a storage means 108, such as a hard disk.

It also has a disk drive 109 adapted to read disks 10, such as diskettes, CD-ROMsU, or computer cards (PC cards).

The disks 10 or hard disk 108 can contain compressed data according to the invention as well as the code of the invention which, once read by the device 10, will be stored on the hard disk 108.

According to a variant, the program enabling the device to implement the invention can be stored in a memory 102 (ROM or Read-Only Memory).

In a second variant, the program can be received and stored in an identical fashion by means of the communication network 113.

The device 10 is also connected to a microphone 111 by means of an input/output card 106. In this case the data to be compressed in accordance with the invention will be an audio signal.

A screen 104 also displays the information to be compressed or serves as an interface with the user, who will be able to parameterise certain compression modes, by means of the keyboard 114 or any other means such as a mouse.

In particular, the total capacity C of the image can be displayed on the screen to enable the user to enter a message to be inserted with a length equal to this capacity C.

The central unit 100 (denoted CPU in FIG. 9) will execute instructions relating to the implementation of the invention, instructions stored in the read only memory 102, or in the other storage elements.

When the device 10 is powered-up, the programs and compression methods stored in one of the non-volatile memories, for example the read only memory 102, are transferred into a random access memory 103 (RAM), which will then contain the executable code of the invention as well as the variables necessary for implementing the invention.

In particular, this random access memory 103 comprises registers adapted to store the variables such as the different blocks b of coefficients, the associated truncation points $NP_b$, the effected partitioning Q of the image, or the key $K_b$ associated with each block b for the insertion of a watermarking signal.

If necessary, the invention can be improved by adding new methods transmitted by the communication network 113 or by means of a diskette 110.

The present invention is not limited to the above embodiments and various changes and modifications can be made within the spirit and scope of the present invention. Therefore, to appraise the public of the scope of the present invention, the following claims are made. The scope of the following claims is to be accorded the broadest interpretation so as to encompass all such modifications and equivalent structures and functions.

What is claimed is:

1. Method for the prior monitoring of the detectability of a watermarking signal inserted by modulation in a set of coefficients representing a physical quantity, comprising the steps of:
    simulating an insertion of at least one bit of information by modulation of the set of coefficients;
    simulating a distortion on the set of modulated coefficients, the distortion corresponding to a given level of compression of the set of coefficients, determined by optimization of a ratio of transmission rate to distortion calculated on the set of coefficients before simulation of an insertion of at least one bit of information by modulation;
    calculating a detectability test on the set of modulated coefficients after distortion; and
    comparing the detectability test with a threshold detection value.

2. Method for the prior monitoring of detectability according to claim 1, wherein, in said distortion simulation step, the distortion is a quantization of each modulated coefficient by a predetermined step corresponding to a limited number of coding passes.

3. Method for the prior monitoring of detectability according to one of claims 1 or 2, further comprising the steps of:
    modulating a set of coefficients by insertion of an information bit and an inverse information bit;
    calculating a detectability test for the insertion of the information bit and on for the insertion of the inverse information bit on all the coefficients modulated after said step of simulating a distortion;
    determining a minimum value, in absolute value, of the detectability test; and
    comparing the minimum value with a threshold detection value.

4. Method of determining a partitioning of a set of coefficients representing a physical quantity for inserting a watermarking signal, comprising the steps of:
    modulating the set of coefficients in order to insert an information bit;
    prior monitoring of the detectability of the information bit inserted by the detectability monitoring method according to claim 1 or 2; and
    dividing all the coefficients into distinct subsets of coefficients if the detectability test calculated is greater than the detection threshold value.

5. A computer-readable medium having embodied thereon a computer program, readable by a microprocessor, comprising portions of software code adapted to implement the method of determining a partitioning according to claim 4 when said program is run by the microprocessor.

6. Method of inserting a watermarking signal during the compression of a set of coefficients representing a physical quantity, comprising the steps of:
    spatio-frequency transformation of the set of coefficients;
    partitioning the set of coefficients into subsets;
    storing coefficients of the subsets;
    entropic coding by successive bit planes of the coefficients of the subsets;
    determining a limit coding point corresponding to a limit number of coding passes on each subset of coefficients, determined by optimization of a ratio of transmission rate to distortion;
    storing the limit coding points for each subset of coefficients;
    inserting by modulation a watermarking signal on the coefficients of the stored subsets, after monitoring the detectability of the watermarking signal inserted according to the method of prior monitoring of the detectability in accordance with claim 1 or 2; and
    entropic coding by successive bit planes of the modulated coefficients.

7. Method of inserting a watermarking signal according to claim 6, wherein, in said inserting step, the watermarking signal comprising information bits ordered by decreasing order of importance, the insertion of the ordered information bits of the watermarking signal is effected in subsets of coefficients of increasing resolution level issuing from a spatio-frequency transformation into frequency sub-bands of the set of coefficients.

8. Method of inserting a watermarking signal according to claim 6, wherein, in said entropic coding step, each bit plane of the coefficients is coded in several passes and at said step of simulating a distortion, the distortion is a restriction of each modulated coefficient to the most significant bit planes coded entirely at the limit coding point.

9. Method of inserting a watermarking signal according to claim 6, wherein said entropic coding step by bit planes of a subset of modulated coefficients is implemented as far as a limit coding point stored for the subset.

10. Method of inserting a watermarking signal according to claim 6, further comprising the step of forming a binary stream from coded modulated coefficients and limit coding points stored for each subset of coefficients.

11. Method of inserting a watermarking signal according to claim 6, wherein, in said step of inserting by modulation of a watermarking signal on a subset of coefficients, a key is calculated in order to generate a pseudo-random signal to be inserted, depending on a secret key, dimensions of the subset of coefficients and a position of the subset in the set of coefficients.

12. A computer-readable medium having embodied thereon a computer program, readable by a microprocessor, comprising portions of software code adapted to implement the method of inserting a watermarking signal according to claim 6 when said program is run by the microprocessor.

13. Device for determining a partitioning of a set of coefficients representing a physical quantity for inserting a watermarking signal, comprising:
    means for modulation of the set of coefficients in order to insert an information bit;

means for prior monitoring of the detectability of the information bit inserted by the detectability monitoring method according to claim 1 or 2; and means for dividing the set of coefficients into distinct subsets of coefficients if the detectability test calculated is greater than the detection threshold value.

14. Device for determining a partitioning according to claim 13, said device being implemented using:
- a microprocessor;
- a read only memory adapted to store a program for determining a partitioning of a set of coefficients; and
- a random access memory comprising registers adapted to store variables modified during the execution of said program.

15. A computer, comprising the device for determining a partitioning according to claim 13.

16. An appliance for processing a digital image, comprising the device for determining a partitioning according to claim 13.

17. Device for inserting a watermarking signal during the compression of a set of coefficients representing a physical quantity, comprising:
- means for spatio-frequency transformation of the set of coefficients;
- means for partitioning the set of coefficients into subsets;
- means for storing coefficients of the subsets;
- means for entropic coding by successive bit planes of the coefficients of the subsets;
- means for determining a limit coding point corresponding to a limit number of coding passes on each subset of coefficients, determined by optimization by ratio of transmission rate to distortion;
- means for storing the limit coding points for each subset of coefficients;
- means for inserting by modulation a watermarking signal on the coefficients of the stored subsets, after monitoring the detectability of the watermarking signal inserted according to the method of prior monitoring of detectability in accordance with claim 1 or 2; and
- means for entropic coding by successive bit planes of the modulated coefficients.

18. Device for inserting a watermarking signal according to claim 17, further comprising means for dividing the stored subsets if the calculated detectability test is greater than the threshold detection value.

19. Device for inserting a watermarking signal according to claim 18, further comprising means for calculating a global capacity of the set of coefficients for the threshold detection value and means for displaying a total capacity.

20. Device for inserting a watermarking signal according to claim 17, further comprising means for forming a binary stream from the coded modulated coefficients and the limit coding points stored for each subset of coefficients.

21. Device for inserting a watermarking signal according to claim 17, said device being implemented using:
- a microprocessor;
- a read only memory adapted to store a program for inserting a watermarking signal during the compression of a set of coefficients; and
- a random access memory comprising registers adapted to store variables modified during the execution of said program.

22. A computer, comprising the device for inserting a watermarking signal during the compression of a set of coefficients according to claim 17.

23. An appliance for processing a digital image, comprising the device for inserting a watermarking signal during the compression of a set of coefficients according to claim 17.

24. A computer-readable medium having embodied thereon a computer program, readable by a microprocessor, comprising portions of software code adapted to implement the method for the prior monitoring of detectability according to claim 1 or 2 when said program is run by the microprocessor.

25. Device for the prior monitoring of the detectability of a watermarking signal inserted by modulation in a set of coefficients representing a physical quantity, comprising:
- means for simulating an insertion of at least one bit of information by modulation of the set of coefficients;
- means for simulating a distortion on all the modulated coefficients, the distortion corresponding to a given level of compression of the set of coefficients, determined by optimization of a ratio of transmission rate to distortion calculated on the set of coefficients before simulation of an insertion of at least one bit of information by modulation;
- means for calculating a detectability test on the set of modulated coefficients modulated after distortion; and
- means for comparing the detectability test with a threshold detection value.

26. Device for the prior monitoring of detectability in accordance with claim 25, wherein said means for simulating a distortion are adapted to apply a quantization to each modulated coefficient by a predetermined step corresponding to a limit number of coding passes.

27. Device for the prior monitoring of detectability according to claim 25 or 26, comprising:
- means for modulating a set of coefficients by insertion of an information bit and an inverse information bit;
- means for calculating a detectability test for the insertion of the information bit and for the insertion of the inverse information bit on the set of coefficients modulated after simulating a distortion;
- means for determining a minimum value, in absolute value, of the detectability tests; and
- means for comparing the minimum value with a threshold detection value.

28. Device for the prior monitoring of detectability according to claim 25 or 26, said device being implemented using:
- a microprocessor;
- a read only memory adapted to store a program for prior monitoring of the detectability of a watermarking signal; and
- a random access memory comprising registers adapted to store variables modified during the execution of said program.

29. A computer, the device for the prior monitoring of the detectability of a watermarking signal according to claim 25 or 26.

30. An appliance for processing a digital image, comprising the device for the prior monitoring of the detectability of a watermarking signal according to claim 25 or 26.

* * * * *

UNITED STATES PATENT AND TRADEMARK OFFICE
CERTIFICATE OF CORRECTION

PATENT NO. : 7,058,200 B2
APPLICATION NO. : 09/971690
DATED : June 6, 2006
INVENTOR(S) : Ioana Donescu et al.

It is certified that error appears in the above-identified patent and that said Letters Patent is hereby corrected as shown below:

COLUMN 1

Line 64, "the coding" should read --coding--.

COLUMN 3

Line 48, "toring its" should read --toring of its--.

COLUMN 6

Line 52, "coefficient X1" should read --coefficient $X_i$--.

COLUMN 7

Line 36, "$Z_4Z_3$" should read --$z_4z_3$--; and
Line 37, "$Z_2$" should read --$z_2$--.

COLUMN 11

Line 42, "tests $T_S$" should read --tests $t_S$--.

COLUMN 12

Line 66, "proper" should read --properly--.

COLUMN 13

Line 31, "test $T_S$" should read --test $t_S$-- and "threshold $t_d$" should read --threshold $T_d$--;
Line 45, "value $T_S$" should read --value $t_S$--; and
Line 47, "test $T_S$" should read --test $t_S$--.

COLUMN 14

Line 38, "disks 10" should read --disks 110--.

UNITED STATES PATENT AND TRADEMARK OFFICE
CERTIFICATE OF CORRECTION

PATENT NO. : 7,058,200 B2
APPLICATION NO. : 09/971690
DATED : June 6, 2006
INVENTOR(S) : Ioana Donescu et al.

It is certified that error appears in the above-identified patent and that said Letters Patent is hereby corrected as shown below:

COLUMN 15

Line 16, "appraise" should read --apprise--; and
Line 50, "and on for" should read --and for--.

Signed and Sealed this

Nineteenth Day of August, 2008

JON W. DUDAS
*Director of the United States Patent and Trademark Office*